(12) United States Patent
Greaves et al.

(10) Patent No.: US 8,609,597 B2
(45) Date of Patent: Dec. 17, 2013

(54) ESTOLIDE COMPOSITIONS HAVING EXCELLENT LOW TEMPERATURE PROPERTIES

(75) Inventors: Martin R. Greaves, Hirzel (CH); Nadjet Khelidj, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 74 days.

(21) Appl. No.: 13/388,873

(22) PCT Filed: Sep. 13, 2010

(86) PCT No.: PCT/US2010/048635
§ 371 (c)(1),
(2), (4) Date: Feb. 3, 2012

(87) PCT Pub. No.: WO2011/037778
PCT Pub. Date: Mar. 31, 2011

(65) Prior Publication Data
US 2012/0172269 A1  Jul. 5, 2012

Related U.S. Application Data

(60) Provisional application No. 61/245,495, filed on Sep. 24, 2009.

(51) Int. Cl.
*C10M 145/22* (2006.01)
(52) U.S. Cl.
USPC ....................................................... 508/465
(58) Field of Classification Search
USPC ....................................................... 508/465
See application file for complete search history.

(56) References Cited

U.S. PATENT DOCUMENTS

| 2,652,411 | A | 9/1953 | Teeter et al. |
| 5,338,471 | A | 8/1994 | Lal |
| 5,413,725 | A | 5/1995 | Lal et al. |
| 6,316,649 | B1 * | 11/2001 | Cermak et al. ................ 554/219 |
| 6,383,992 | B1 | 5/2002 | Garmier et al. |
| 2008/0108533 | A1 * | 5/2008 | Peer et al. ...................... 508/469 |
| 2009/0088350 | A1 * | 4/2009 | Muir .............................. 508/190 |

FOREIGN PATENT DOCUMENTS

| DE | 102007040636 | | 11/2008 |
| EP | 712834 | A1 | 5/1996 |
| WO | 99/25794 | | 5/1999 |
| WO | WO 9925794 | A1 * | 5/1999 |
| WO | 01/53247 | A1 | 7/2001 |
| WO | 2006/129439 | | 12/2006 |
| WO | 2011/005635 | A1 | 1/2011 |

OTHER PUBLICATIONS

C. H. Sern, et al, The Effect of Polymers and Surfactants on the Pour Point of Palm Oil Methyl Esters, European Journal of Lipid Science and Technology (2007) 109(4) 440-444.
T. L. Ooi, et al, Enhancement of Cold Stability of Palm Oil Methyl Esters, Jounal of Oil Palm Research (2005), 17, 6-10. Abstract only.
S.C. Cermak, et al, Synthesis and Physical Properties of Mono-Estolides with Varying Chain Lengths, Industrial Crops and Products, (2009), 29, 205-213.

* cited by examiner

*Primary Examiner* — Taiwo Oladapo

(57) ABSTRACT

A lubricant or process fluid composition having excellent low temperature properties comprises a capped estolide ester, a polyalphaolefin, a synthetic ester and/or polyalkylene glycol, and a pour point depressant. The combination of the three base oils plus the pour point depressant produces a synergistic composition that may have a pour point less than −15° C., preferably less than −35° C., while also having more than 50 percent by weight renewable carbons and being economical and effective in a wide variety of applications.

18 Claims, No Drawings

US 8,609,597 B2

ESTOLIDE COMPOSITIONS HAVING EXCELLENT LOW TEMPERATURE PROPERTIES

CROSS-REFERENCE TO RELATED APPLICATIONS

This application is a 35 USC §371 national phase filing of PCT/US2010/048635 filed Sep. 13, 2010, which claims the benefit of U.S. Application No. 61/245,495, filed Sep. 24, 2009.

BACKGROUND

1. Field of the Invention

This invention relates to the field of lubricants and process fluids. More specifically, it relates to lubricants and process fluids, based on esters of fatty acid oils, that may be designed to have pour points below −15° C. and even below −35° C. and are therefore suitable for use at such low temperatures.

2. Background of the Art

The lubricants (engine and non-engine) and process fluids industries today are searching for materials that are biodegradable. Biodegradability means that the lubricants and process fluids (hereinafter "fluids") degrade over a period of time, which may be measured by tests such as those promulgated by the Organization of Economic Co-Operation and Development (OECD), including OECD 301B and OECD 301F. Recently, interest has been increasing in fluids which are not only biodegradable, but also renewable. Renewable products contain, by definition, high levels of renewable carbons, and standards are being set to encourage increasingly greater levels of renewability. For example, the European Ecolabel now requires that hydraulic fluids must contain at least 50 percent by weight renewable carbons.

Researchers have attempted to meet requirements or recommendations for both biodegradability and renewability by including in their fluids formulations a variety of types of natural oils. Of particular use have been the natural esters, including for example canola oil, sunflower oil, rapeseed oil, and palm oil, which have renewable carbon levels of 100 percent. Unfortunately, these natural esters often suffer from poor performance at low temperatures. This is exhibited by their having relatively high pour points, which is the highest temperature at which the material stops flowing, and is often the result of a marked viscosity increase caused by crystallization. Because natural esters typically have pour points ranging from 0 to −15 degrees Celsius (° C.), these materials may be essentially useless for the many applications where they would be exposed to these, and even lower, temperatures. Another problem with the natural esters is that they tend to have commercially undesirable levels of thermo-oxidative stability, which is due to the unsaturation within the acid fraction of their chemical structures.

In some cases synthetic esters may be used as alternatives to natural esters. Synthetic esters may, in some instances, have very low pour points (less than −50° C.) and commercially desirable levels of thermo-oxidative stability. However, most synthetic esters are derived from petrochemical feed stocks and therefore have very low (less than 50 percent by weight), and even zero, renewable carbon levels. They also are much more expensive than natural esters, and therefore may not be economically desirable for many applications.

Despite these challenges, however, there continue to be major incentives to produce fluids with commercially desirable levels of biodegradability and renewable carbons as well as very low pour points, that is, below −15° C. and particularly below −35° C. Recently Caterpillar, Inc., the world's largest manufacturer of construction and mining equipment, diesel and natural gas engines, and industrial gas turbines, released a specification, "Cat BF-2," for bio-hydraulic fluids. This specification requires that qualifying fluids have pour points below −35° C., and also requires that such fluids meet the requirements of the European Ecolabel and therefore contain at least 50 percent by weight renewable carbons. Fluids manufacturers may be unable to meet specifications of this nature unless new fluid formulations are developed. In view of this trend, those skilled in the art must continue to seek fluid formulations that provide desirable levels of biodegradability and renewability, while also offering low pour points to enable use at cold temperatures, and relatively low cost to ensure economic and/or commercial viability.

SUMMARY OF THE INVENTION

In one aspect the invention provides a lubricant or process fluid composition comprising (a) a capped estolide ester; (b) a polyalphaolefin; (c) a synthetic ester or polyalkylene glycol; and (d) a pour point depressant additive. Such compositions may be designed to obtain pour point temperatures less than −15° C., and in particular embodiments, less than −35° C., and may have renewable carbon levels of at least 50 percent by weight.

In another aspect the invention provides a method of preparing the lubricant or process fluid composition comprising contacting (a) a capped estolide ester; (b) a polyalphaolefin; (c) a synthetic ester or polyalkylene glycol; and (d) a pour point depressant additive, under conditions suitable to form the lubricant or process fluid composition.

DETAILED DESCRIPTION OF THE EMBODIMENTS

The inventive compositions generally provide a relatively high level of renewable carbons (greater than 50 percent by weight), and relatively good oxidation stability, low temperature properties, and low production cost. As such they offer the industry options that have not heretofore been available. These compositions include a synergistic combination of constituents that can achieve pour point levels that might not be achieved with any one, two or three required constituents of the composition in the absence of any fourth required constituent. The four required constituents are a capped estolide ester; a polyalphaolefin; a synthetic ester or polyalkylene glycol; and a pour point depressant; as discussed further hereinbelow.

The Capped Estolide Ester

The first constituent is a capped estolide ester, which serves as a first base oil. This capped estolide ester contains more than 70 percent by weight renewable carbons. In general, "estolides" are oligomeric fatty acids formed by condensation of two or more fatty acid units to yield an ester linkage. The condensation is typically achieved by adding a carboxylic acid moiety onto a double bond via acid catalysis.

In the present invention, the selected estolide ester is prepared from a secondary hydroxyl fatty acid which is oligomerized, transesterified with an alcohol, and then capped. Preparation of this capped estolide ester may be carried out by any effective method. However, in one particular and non-limiting embodiment a suitable capped estolide ester may be prepared by a method including (a) oligomerizing a methyl ester of 12-hydroxystearic acid to form an oligomerized methyl ester; (b) transesterifying the oligomerized methyl ester with a branched alcohol to form an estolide ester; and (c)

capping the estolide ester with an acid, an acid anhydride, or an ester to form the desired capped estolide ester.

In greater detail, the hydroxylated fatty acid compound (for example, a methyl ester of a 12-hydroxy fatty acid, such as 12-hydroxystearic acid) is first at least partially homopolymerized using a tin-, titanium-, or nitrogen-containing catalyst and forming methanol is removed. The methanol removal may be accomplished by means of an entrainer, reduced pressure, and/or nitrogen sparging. The result of this step is an oligomerized methyl ester which includes a distribution of compounds of Formula 1 as follows:

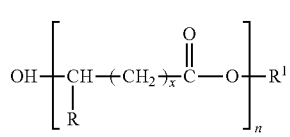

Formula 1 where R is an alkyl group containing from 6 to 12 carbon atoms, $R^1$ is hydrogen or a methyl radical, x is an integer from 8 to 12, and n is an integer from 1 to 20.

The oligomerized ester is then recovered from residual methanol and/or the entrainer, and then reacted with a branched alcohol having from 2 to 20 carbon atoms. In certain desirable and non-limiting embodiments, the alcohol may be selected from 2-ethylhexanol, 2-(2-butoxypropoxy)propan-1-ol (DPnB), 1-octanol and 2-octanol. Additional tin-, titanium-, or nitrogen-containing catalyst may be employed at this point, and formed methanol is removed, yielding an estolide ester represented by a distribution of compounds represented by Formula 2, as follows:

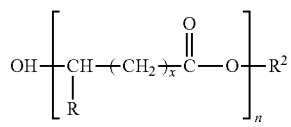

Formula 2 where R, x and n are as defined above and $R^2$ is an alkyl group that contains from 1 to 20 carbon atoms.

At this point the product estolide ester may be recovered from excess alcohol and residual methanol and then reacted with an acid, an acid anhydride or an ester to form a capped estolide ester. In certain particular embodiments an acid anhydride of Formula 4 may be used:

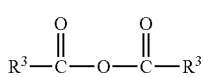

Formula 3 where $R^3$ is as defined above. Illustrative anhydrides include isobutyric anhydride. The distribution of product capped estolide esters may be represented by Formula 4 as follows:

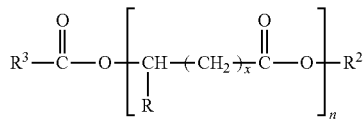

Formula 4 where R, x and n are as defined above, $R^2$ is an alkyl group that contains from 1 to 20 carbon atoms, and $R^3$ is an alkyl group that contains from 1 to 12 carbon atoms. The capped estolide ester may be recovered from excess acid, acid anhydride or ester.

Suitable capped estolide esters may, certain non-limiting embodiments, have a pour point that is less than −10° C., a viscosity index greater than or equal to 150, a kinematic viscosity at 40° C. (according to ASTM D445) that is more than 25 centistokes (cSt) (0.000025 m²/second), and a total acid number less than 1 milligram of potassium hydroxide per gram (mg KOH/g). In particular embodiments the capped estolide esters have a pour point that is less than −30° C., and a kinematic viscosity at 40° C. that is desirably more than 35 cSt (0.000035 m²/second) and more desirably more than 45 cSt (0.000045 m²/second). It may also have a hydroxyl number of less than or equal to 10, preferably less than 8, more preferably less than 5, still more preferably less than 4, and even more preferably less than 3.

In carrying out the method described to prepare the capped estolide esters used in the inventive compositions, those skilled in the art should be able to easily discern suitable reaction protocols and conditions. However, it may be noted that the temperature for the first step, that of partial homopolymerization or oligomerization or condensation of the hydroxylated fatty acid compound, and also azeotropic distillation of the methanol formed during the reaction, is desirably from 70° C. to 220° C., more desirably from 120° C. to 210° C., and still more desirably from 180° C. to 200° C.

The temperature for the reaction between the oligomerized ester and branched alcohol may easily be accomplished at a temperature from 70° C. to 220° C., and in certain particular embodiments from 120° C. to 210° C., still more particularly from 180° C. to 200° C. The branched alcohol is desirably present in an amount sufficient to provide at least one molar equivalent of alcohol for each molar equivalent of the oligomerized ester.

The capping of the estolide ester is desirably carried out at a temperature from 80° C. to 160° C., more preferably from 100° C. to 140° C., and still more desirably from 110° C. to 130° C.

Additional direction concerning preparation of the capped estolide esters useful in the present invention may be found in co-pending U.S. Provisional Patent Application Ser. No. 61/224,532, filed Jul. 10, 2009, Attorney Docket C-68,181, which is incorporated herein by reference in its entirety.

The Polyalphaolefin

A second required constituent of the inventive compositions is a polyalphaolefin. Polyalphaolefins are typically manufactured from C8 to C14 olefins, and the result is generally combinations of dimers, trimers, tetramers, pentamers, and so forth. The polyalphaolefin provides a second base oil and may be selected from any that has a kinematic viscosity at 100° C. that is less than 15 cSt (0.000015 m²/second), a kinematic viscosity at 40° C. that is less than 100 cSt (0.0001 m²/second), a viscosity index greater than 120, an open cup flash point of greater than 150° C., and a pour point that is less than −30° C. Kinematic viscosity is measured according to American Society for Testing Materials (ASTM) D-445, open cup flash point is measured according to ASTM D-92, and pour point is measured according to ASTM D-97. In certain desirable embodiments the selected polyalphaolefin has a pour point that is less than −60° C. Examples may include isoparaffinic synthetic NEXBASE™ 2004 polyalphaolefins, available from Neste Oil N.V. in Belgium; SYNFLUID™ PAO-4, available from Chevron Phillips; and DURASYN™ 164 available from Ineos Group Limited. SYNFLUID™ PAO-4 has a kinematic viscosity at 100° C. of 4 cSt (0.000004 m$^2$/second) and a pour point of −69° C. DURASYN™ 164 has a kinematic viscosity at 100° C. of 2 cSt (0.000002 m$^2$/second) and a pour point of less than −55° C.

The Synthetic Ester and/or Polyalkylene Glycol

A third base oil constituent is a synthetic ester, a polyalkylene glycol, or both. Where a synthetic ester is selected, it is preferably, in certain particular embodiments, a material having a kinematic viscosity at 40° C. (according to ASTM D-445) greater than 10 cSt (0.00001 m$^2$/second), a pour point below −30° C. (according to ASTM D-97), an acid value of 0.2 mg KOH/g maximum, and a viscosity index of greater than 100. More desirably, it has a kinematic viscosity that is greater than 25 cSt (0.000025 m$^2$/second) at 40° C., and still more desirably the kinematic viscosity is greater than 40 cSt (0.000040 m$^2$/second). In preferred embodiments it may be a dicarbonic acid ester. These are produced via the reaction of an alcohol with a diacid, such as adipic acid. Examples may include SYNATIVE™ ES DEHA, available from Cognis. This dicarbonic acid ester (2-ethylhexyladipate) has a kinematic viscosity of 11.5 cSt (0.0000115 m$^2$/second) at 40° C., or 3.4 cSt (0.0000034 m$^2$/second) at 100° C., a viscosity index of 150, an acid value of 0.2 mg KOH/g maximum, an iodine value of 0.3 g iodine per 100 g sample, and a pour point of −70° C. Other examples may include di(2-ethylhexyl)sebacate and di(iso-tridecyladipate). Also useful are certain polyol esters, such as those produced from neopentyl glycol or trimethylolpropane or pentaerythritol with fatty acids. For example, trimethyolpropane trioleate, available from Cognis under the tradename SYNATIVE™ ES TMP-05-H, has a kinematic viscosity of 46 cSt (0.000046 m$^2$/second) at 40° C., an acid number of 0.2 mg KOH/g maximum, and a pour point of less than −40° C. Also useful may be monoacid esters. These can be produced by a reaction of a monoacid such as oleic acid with an alcohol such as isopropyl alcohol. In this particular instance the result would be isopropyloleate. An example is PRIOLUBE™ 1406, available from Croda. It has a kinematic viscosity of 5.3 cSt (0.0000053 m$^2$/second) at 40° C., a viscosity index of 221, an acid number of 0.2 mg KOH/g maximum, and a pour point of −25° C.

Where a polyalkylene glycol is selected, such is, in certain desirable embodiments, selected such that it is miscible with the capped estolide and preferably has a kinematic viscosity ranging from 15 to 100 cSt (0.000015 to 0.0001 m$^2$/second) at 40° C. In certain particular embodiments the polyalkylene glycol is a polypropoxylate (100 percent propylene oxide) initiated on a monol, diol or higher alcohol; polybutoxylate (100 percent butylene oxide) on a monol, diol, or higher alcohol; a random or block copolymer of propylene oxide and butylene oxide; or a random copolymer of ethylene oxide and propylene oxide. An example may include SYNALOX™ 100-20B, 100-30B, 100-40B or 100-50B, available from The Dow Chemical Company. Alternative choices may include UCON™ LB-135, LB-165 or LB-285, also available from The Dow Chemical Company. All of these products are based on a monol initiator (such as butanol) which has been propoxylated using propylene oxide such that the polymer contains 100 propylene oxide monomer units as the oxide. In general it may be desirable to avoid relatively hygroscopic polymers and/or those which may tend to emulsify the estolide ester.

Particular combinations where both a synthetic ester and a polyalkylene glycol are employed in a single formulation may include dicarbonic acid esters (such as SYNATIVE™ ES DEHA) and a butanol initiated propoxylate (such as SYNALOX™ 100-30B). In such combinations it is desirable, in certain embodiments, that the synthetic ester represent a relatively major part of the combination of synthetic ester and polyalkylene glycol, while the polyalkylene glycol represents a relatively minor part.

Pour Point Depressant (PPD)

A final required constituent of the present inventive compositions is at least one pour point depressant (PPD). PPD's are commercially available in many forms, and as used herein the term broadly encompasses any pour point depressant that acts synergistically with one or more of the other constituents of the inventive fluid formulations to lower the pour point. Synergism in this application is defined as lowering the pour point to a temperature below that of either the PPD alone or of the other three combined constituents (capped estolide ester, polyalphaolefin, synthetic ester and/or polyalkylene glycol). In certain embodiments of the present invention the PPD may include esters of carboxy-containing interpolymers, such as are available commercially from The Lubrizol Corporation and also described in detail in, inter alia, U.S. Pat. Nos. 5,338,471 and 5,413,725, which are incorporated herein by reference in their entireties. One particular example is LUBRIZOL™ 7671A. Other PPD's useful in the present invention include styrene based polymers and polyalkyl methacrylates in general. Styrene based PPD's may include poly(styrene-maleate esters). In general PPD's operate by interfering with the crystallization of the base oil(s) at low temperature, resulting in the formation of fewer and/or smaller crystals at a given temperature. This generally lowers the pour point of the composition as a whole.

Additional Constituents

In addition to the four required constituents (the synthetic ester and/or polyalkylene glycol being considered together as one constituent), the inventive compositions may include, in certain embodiments, additional constituents, of the types conventionally used in the art to desirably modify the properties of the lubricant or process fluid compositions being prepared. Such may include, for example, antioxidants (for example, IRGANOX™ L101, a phenolic anti-oxidant available from BASF); friction modifiers (for example, NALUBE™ AW6110, amine salts of an aliphatic phosphoric acid ester, from King Industries); yellow metal passivators (for example, IRGAMET™ TTZ, from BASF); viscosity modifiers; anti-corrosives; antiwear agents; detergents; colorants; antifoam agents; demulsifiers; combinations thereof; and the like.

Preparation and Proportions in Composition

In general it is desirable to simply contact or combine the four minimum required constituents in any way known to those skilled in the art to be generally effective in preparing mixtures. Homogenization of any mixture is desirable to ensure uniformity of properties, and particularly of pour point and therefore of low temperature performance, of a given batch, semi-batch or continuously prepared composition. Thus, rotary mixers and other types of laboratory- and commercial-scale mixing equipment may be among possible types of processing equipment selected. Mixing of the constituents may be carried out under any convenient conditions, but for most purposes conditions of ambient temperature and pressure are convenient, inexpensive, and effective. In certain embodiments, however, temperatures may range from ambient to 60° C., and are desirably high enough to ensure that dissolution of the constituents in one another is attained. It is also desirable that, once dissolution has been attained, it is then maintained without further processing when the constituents return to ambient temperature and during exposure to conditions typically encountered during any necessary shipping and/or storage.

In proportion it is desirable, in certain non-limiting embodiments, that the inventive compositions comprise the capped estolide ester in an amount from 70 to 80 percent by weight; the polyalphaolefin in an amount from 8 to 12 percent by weight; the synthetic ester and/or polyalkylene glycol in a total amount from 8 to 12 percent by weight (and where combined, it is desirable that the synthetic ester represent from 50 to 80 percent by weight of this constituent, with the polyalkylene glycol being from 50 to 20 percent by weight); and the PPD from 0.2 to 2 percent by weight; all based upon total composition weight.

Where additional constituents are included, such are generally employed in total amount of less than 5 percent by weight, and/or individual amounts varying from 0.05 to 2 percent by weight on the same basis.

The compositions of the invention may be applicable to a wide variety of lubricant and process fluid applications, including but not limited to use as machine and engine crankcase oils, hydraulic fluids, drilling fluids, two-cycle engine oils, and the like. Such may include applications in industries ranging from textiles, food, electronics, power generation, paper and pulp, tire molding, reactive gas, corrugating, chemical processing, aerospace, and automotive, both noise/vibration/harshness (NVH) and underhood.

EXAMPLES

Examples 1 & 2

A capped estolide ester is prepared from a methyl ester of 12-hydroxystearic acid, beginning by using a 5 liter (L) glass reactor equipped with a temperature controller, an overhead stirrer, an electric heater and a Dean-Stark apparatus with water condenser connected to a vacuum/nitrogen line. To this reactor is added 968.22 grams (g) (3.1 moles) of methyl-12-hydroxystearate (M12HSA), 150 grams of nonane and 3.25 g (0.5 mole percent (mol %), based upon moles of M12HSA) tin(II)-2-ethylhexanoate to form a mixture. The mixture is heated to a set point temperature of 200° C. and maintained at that temperature with stirring for a period of four hours (hrs), removing generated methanol via azeotropic distillation with nonane. Total methanol collection amounts to 52 g (1.6 moles), equating to 54 percent condensation or 46 percent remaining methyl ester functionality yielding a product with a distribution of compounds represented by Formula 5 as follows:

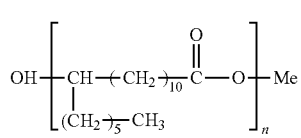

Formula 5

The remaining nonane is then removed under reduced pressure and reactor contents are cooled to a set point temperature of 135° C. A Vigreaux distillation column is placed between the reactor and the Dean-Stark apparatus, then 303.56 g (2.3 moles) of 2-ethylhexanol (2-EH) and 3.25 g (0.008 mole) of tin(II)dioctoate is added to the reactor and the reactor contents are heated, with stirring, to a set point temperature of 190° C. for six hours. The methanol formed during this step (36.3 g, 1.13 moles) is removed from the reactor contents by fractional distillation.

The reactor contents are then distilled under reduced pressure (50 kPa) to remove both the residual methanol not removed via fractional distillation and any excess 2-ethylhexanol. The resultant product is a distribution of compounds represented by Formula 6 as follows:

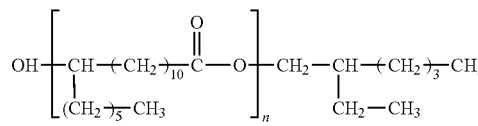

Formula 6

The reactor contents are then cooled to a set point temperature of 130° C. and 220.5 g (1.52 moles) of isobutyric anhydride is added to the reactor and the reactor contents cooled for two hours. Excess isobutyric anhydride and acid formed during capping with the isobutyric anhydride is removed under reduced pressure. The reduced pressure is maintained for two hours, then the reactor contents are cooled to a set point temperature of 70° C. and 100 milliliters (mL) of a 0.5 molar (M) sodium hydrogen carbonate ($NaHCO_3$) in water solution is added to the reactor with stirring. The set point temperature is maintained with stirring for one hour, then water is removed under reduced pressure. An amount of magnesium silicate, 10 g, activated carbon, 5 g, and magnesium sulfate ($MgSO_4$), 10 g, are combined in the reactor, then filtered using a filter paper coated with 80 g of magnesium silicate to yield a final product with a distribution of compounds represented by Formula 7 as follows:

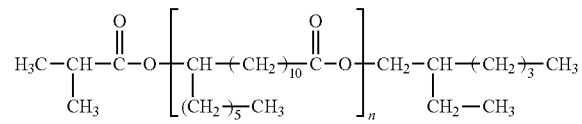

Formula 7

Table 1 below summarizes physical property information for the final capped estolide ester.

TABLE 1

| Physical Property/material | Capped Estolide Ester |
| --- | --- |
| Viscosity @ 40° C. centistokes, cSt ($m^2$/second) | 54.3 (0.0000543) |
| Viscosity @ 100° C. centistokes, cSt ($m^2$/second) | 9.81 (0.00000981) |
| Viscosity Index | 168 |
| Pour Point, ° C. | −14 |
| Total Acid Number, mg KOH/g | 0.04 |
| Water content, weight percent, wt % | 0.026 |
| OH Number, mg KOH/g | <3 |

The capped estolide ester is then combined with a polyalphaolefin (NEXBASE™ 2004), a synthetic ester (SYNATIVE™ DEHA) or a polyalkylene glycol (SYNALOX™ 100-30B) and a pour point depressant (PPD) (LUBRIZOL™ 7671 A) in the proportions shown in Table 2. NALUBE™ AW6110 (amine salts of an aliphatic phosphoric acid ester, as an antiwear additive), IRGANOX™ L101 (phenolic antioxidant), and IRGAMET™ TTZ (yellow metal passivator) are also used in the amounts shown in Table 2. These constituents are mixed at 50° C. in a rotary mixer for 1 hour. Pour points are tested according to ASTM D-97, and the results are reported in Table 2.

TABLE 2

| Constituent | Example 1 | Example 2 |
| --- | --- | --- |
| Capped estolide ester | 77.65 | 77.65 |
| SYNATIVE DEHA (ester) | 10 | — |
| SYNALOX 100-30B (PAG) | — | 10 |
| NEXBASE 2004 (PAO) | 10 | 10 |
| LUBRIZOL 7671A | 1 | 1 |
| NALUBE AW6110 | 0.25 | 0.25 |
| IRGANOX L101 | 1 | 1 |
| IRGAMET TTZ | 0.1 | 0.1 |
| Pour Point, ° C. | −40 | −40 |

— indicates not present in formulation

Examples 3-4 and Comparative Examples 1-2

Samples are prepared for pour point testing according to ASTM D-97. Example 3 is the same as Example 1 hereinabove. Comparative Example 1 includes only the pure capped estolide. Comparative Example 2 includes a combination of the capped estolide ester, the LUBRIZOL 7671A PPD in an amount of 1 percent, the synthetic ester SYNATIVE ES DEHA, and the SYNALOX 100-30B, the latter two constituents being each present at a level of 10 percent by weight. Comparative Example 2 lacks any polyalphaolefin. Example 4 includes a combination of the capped estolide ester, the LUBRIZOL 7671A PPD in an amount of 1 percent, the SYNALOX 100-30B polyalkylene glycol, and the NEXBASE 2004 polyalphaolefin, the latter two constituents being each present at a level of 10 percent by weight.

Table 3 is a comparison of the pour points for each of the four samples.

TABLE 3

| | Example 3 | Comparative Example 1 | Comparative Example 2 | Example 4 |
| --- | --- | --- | --- | --- |
| Pour Point, ° C. | −40 | −16 | −31 | −37 |

Examples 5-7

Three more formulations are prepared using the method described for Examples 1 and 2. The formulations are shown in Table 4. Pour points are measured according to ASTM D-97 and are shown in Table 4.

TABLE 4

| Constituent | Example 5 | Example 6 | Example 7 |
| --- | --- | --- | --- |
| Capped estolide ester | 79 | 79 | 79 |
| SYNATIVE DEHA (ester) | 10 | 10 | — |

TABLE 4-continued

| Constituent | Example 5 | Example 6 | Example 7 |
| --- | --- | --- | --- |
| SYNFLUID PAO-4 (PAO) | 10 | — | 10 |
| DURASYN 164 | — | 10 | — |
| SYNALOX 100-30B | — | — | 10 |
| LUBRIZOL 7671A | 1 | 1 | 1 |
| Pour point, ° C. | −40 | −37 | −31 |

— indicates not present in formulation

What is claimed is:

1. A lubricant or process fluid composition comprising
   (a) a capped estolide ester;
   (b) a polyalphaolefin;
   (c) a synthetic ester or polyalkylene glycol; and
   (d) a pour point depressant additive further characterized by the capped estolide ester being represented by the following formula:

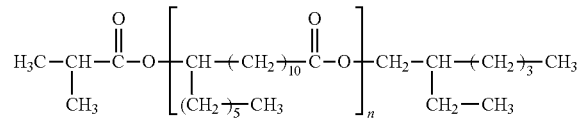

where n is an integer from 1 to 20.

2. The composition of claim 1 having a pour point that is less than −15° C.

3. The composition of claim 2 having a pour point that is less than −35° C.

4. The composition of claim 1 wherein the polyalphaolefin is selected from the group consisting of polyalphaolefins having a kinematic viscosity less than 5 cSt (0.000005 m$^2$/second) at 100° C., according to ASTM D-445, and a pour point less −30° C., according to ASTM D-97.

5. The composition of claim 4 wherein the polyalphaolefin has a pour point, according to ASTM D-97, that is less than −60° C.

6. The composition of claim 1 wherein the synthetic ester has a kinematic viscosity greater than 10 cSt (0.00001 m$^2$/second) at 40° C., according to ASTM D-445, and a pour point less than −30° C., according to ASTM D-97.

7. The composition of claim 6 wherein the synthetic ester is selected from the group consisting of dicarbonic acid esters, polyol esters, monoacid esters and combinations thereof.

8. The composition of claim 7 wherein the dicarbonic acid esters are selected from 2-ethylhexyladipate, di(2-ethylhexyl)sebacate, di(iso-tridecyladipate), and combinations thereof, and the polyol esters are selected from those produced from the reaction of a fatty acid with neopentyl glycol, trimethylolpropane, pentaerythritol, or a combination thereof.

9. The composition of claim 7 wherein the synthetic ester is trimethylolpropane trioleate.

10. The composition of claim 1 wherein the polyalkylene glycol is miscible with the capped estolide ester and has a kinematic viscosity from 15 to 100 cSt (0.000015 to 0.0001 m$^2$/second) at 40° C., according to ASTM D-445.

11. The composition of claim 10 wherein the polyalkylene glycol is selected from the group consisting of polypropoxylates and polybutoxylates initiated on an alcohol; random and block copolymers of propylene oxide and butylene oxide; random copolymers of ethylene oxide and propylene oxide; and combinations thereof.

12. The composition of claim 1 wherein the pour point depressant is selected from the group consisting of carboxy-containing interpolymers, styrene-based polymers, and polyalkyl methacrylates.

13. A method of preparing a lubricant or process fluid composition comprising mixing together
(a) a capped estolide ester;
(b) a polyalphaolefin;
(c) a synthetic ester or polyalkylene glycol; and
(d) a pour point depressant additive,
under conditions suitable to form a lubricant or process fluid composition having a pour point less than −15° C. further characterized by the capped estolide ester being represented by the following formula;

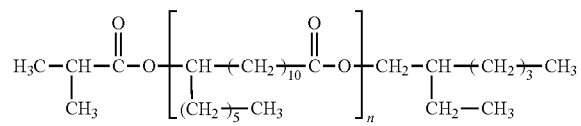

where n is an integer from 1 to 20.

14. The method of claim 13 wherein the capped estolide ester is present in an amount ranging from 70 to 80 percent by weight; the polyalphaolefin is present in an amount ranging from 8 to 12 percent by weight; the synthetic ester or polyalkylene glycol is present in an amount ranging from 8 to 12 percent by weight; and the pour point depressant additive is present in an amount ranging from 0.5 to 2 weight percent, based on total weight of the composition.

15. The method of claim 13 wherein the mixing is carried out at a temperature ranging from ambient to 60° C.

16. The method of claim 13 wherein the capped estolide ester is prepared by a method comprising
(a) oligomerizing a secondary hydroxyl fatty acid to form a fatty acid oligomer;
(b) transesterifying the fatty acid oligomer with an alcohol to form an estolide ester; and
(c) capping the estolide ester with an acid, acid anhydride or ester to form a capped estolide ester.

17. The method of claim 16 wherein the secondary hydroxyl fatty acid is a methyl ester of 12-hydroxystearic acid, and the alcohol is a branched alcohol.

18. The method of claim 13 wherein the pour point is less than −35° C.

* * * * *